United States Patent [19]
Holzer

[11] 3,939,974
[45] Feb. 24, 1976

[54] DOWEL

[75] Inventor: Anton Holzer, Wien-Fischamend, Austria

[73] Assignee: Wien-Fischamender Metallwarenfabrik Josef Suschny & Sohne, Vienna, Austria

[22] Filed: Oct. 22, 1974

[21] Appl. No.: 517,060

[30] Foreign Application Priority Data
Oct. 25, 1973  Austria .............................. 9051/73

[52] U.S. Cl. ................. 206/343; 206/820; 403/292
[51] Int. Cl.² ........................................... B65D 85/24
[58] Field of Search ........... 206/345, 820, 338, 340, 206/346, 343; 403/292, 293; 52/753 E

[56] References Cited
UNITED STATES PATENTS

| 3,351,365 | 11/1967 | Bickl | 403/292 |
| 3,527,486 | 9/1970 | Gamp | 52/753 E |
| 3,676,898 | 7/1972 | Rock | 52/753 E |
| 3,736,834 | 6/1973 | MacDonald | 403/293 |
| 3,810,341 | 5/1974 | Hole | 403/292 |

Primary Examiner—William T. Dixson, Jr.
Attorney, Agent, or Firm—Cushman, Darby & Cushman

[57] ABSTRACT

Dowels being united to a stripe by severable straps consisting of the material of the dowels, said stripe being adapted for being inserted into the magazine of a shooting or blowing apparatus, characterized in that each dowel is provided at its front face opposing the rammer of the shooting or blowing apparatus with at least one recess extending in longitudinal direction of the stripe.

5 Claims, 4 Drawing Figures

DOWEL

Shooting or blowing apparatus for dowels, as a rule, comprise a magazine into which the dowels to be used are being inserted. Such dowels are, as a rule, united by severable straps to form a stripe and such stripes are being inserted into the magazine, noting that the dowels are severed one by one from the stripe by means of the rammer of the shooting or blowing apparatus. The stripes are guided within the magazine and the dowels are supplied to the rammer by means of a spring acting on the rearward end of the stripe. In known constructions the dowels are guided within the magazine by their side portion of its circumference engaging the inner side walls of the magazine.

Usual dowels are given a saw-tooth profile or a furrowed longitudinal profile for providing an improved anchoring of the dowels within the previously bored holes. Thus, the dowels are guided by the walls of the magazine channel only by the circular edges of their circumference so that, particularly with dowels manufactured from plastics material and in view of the ease of deformation of such material, the dowels are not precisely guided. This has as a consequence that the stripe of dowels will become bent and, respectively, undulated under the influence of the spring serving for supplying the dowels to the rammer and the dowels will become jammed within the channel provided within the magazine for guiding the stripes of dowels, which frequently will give rise to disturbances in operation.

The invention refers to such dowels which are united to a stripe by severable straps consisting of the material forming the dowels, said stripes being adapted for being inserted into the magazine of a shooting or blowing apparatus and the present invention aims at avoiding the disadvantages of known dowels. The invention essentially consists in that each dowel is provided at its front face opposing the rammer of the shooting or blowing apparatus with at least one recess extending in longitudinal direction of the stripe. According to an advantageous embodiment, the recess is formed by a groove being arranged in the middle of said front face and preferably being provided with plane side walls.

The side walls of said recess and respectively, said groove are acting as guiding surfaces so that the dowels may be guided along longitudinally extending ribs of the magazine. With dowels provided with a groove arranged in the middle of the front face of the dowel the dowels can be guided in a particularly effective manner by a guiding rib arranged in the middle of the bottom of the magazine channel. Such a guide means which is formed by a guiding rib engaging a groove is acting quite precisely because the recess or groove has smooth guiding surfaces. Thus it is no more possible that the stripes become ondulated and, respectively, the dowels become edgewisely jammed within the guiding channel. Apart from this, guiding of the dowels along the plane surfaces of the groove results in an essentially reduced resistance against shifting movement than guiding of the dowels along the side walls of the magazine channel, which equal contributes to avoiding disturbances in operation. The stripes of dowels can now be acted upon by a spring of essentially reduced spring compression, noting that the severable straps connecting the dowels to form a stripe may more effectively withstand the spring force. Moreover, further advantages result. The magazine channel can be open at its sides, because side walls acting as guiding surfaces are no more required, so that a stripe inserted into the guiding channel is easily visible and near consumption of the stripe can be recognized at any time. A further advantage resides in that the magazine channel, which does not require side walls for guiding the stripe, can be given a greater width. Thus it becomes possible to use the same shooting or blowing apparatus and the magazine rigidly connected therein for differently shaped dowels and dowels of different dimensions, noting that it is only necessary to form the shooting channel of an interchangeable mouth-piece, said shooting channel corresponding to the diameter of the dowels just to be used. The comparatively expensive shooting or blowing apparatus can thus be made use for various purposes.

Conveniently, the construction is such that the width of the groove amounts to one third to one sixth, preferably one fifth, of the diameter of the dowel, noting that the depth of the groove may be approximately equal to the width thereof. In this manner, the guiding surfaces of the groove are sufficient for the intended purpose.

The invention is further illustrated with reference to the drawing showing an embodiment of the present invention.

Figure 1:
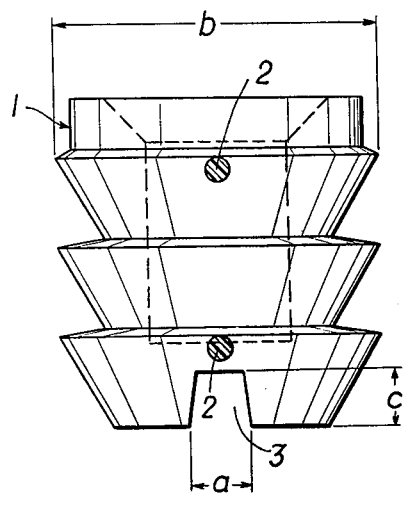
FIG. 1 and FIG. 2 represent dowels interconnected to form a stripe, FIG. 2 showing a side elevation of the stripe and FIG. 1 showing a section along line I—I of FIG. 2.
Figure 2:
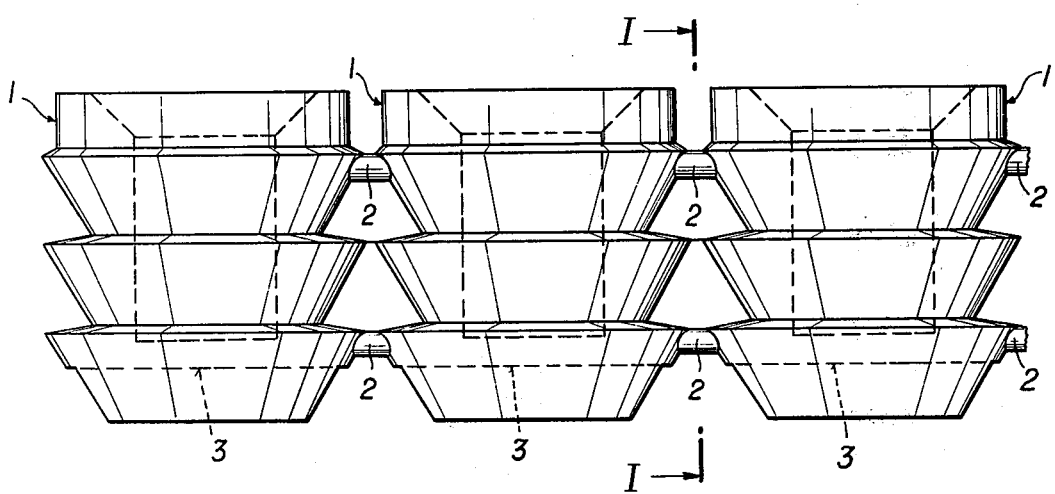

As shown in FIG. 2, the individual dowels 1 consisting of synthetic plastics material are connected to a stripe by severable straps 2 of the same material. A length of the stripe corresponding to the length of the magazine is being torn from the stripe and introduced into the magazine. As is shown in FIGS. 1 and 2, the dowel 1 is provided with a groove 3 extending in longitudinal direction of the stripe and being arranged at the front face opposing the rammer. The width $a$ of this groove approximately corresponds to one fifth of the diameter $b$ of the dowel 1 and the depth $c$ is approximately equal to the width $a$ thereof. The cross-section of the groove has a taper in direction to the bottom of the groove so that the dowels can easily be put on the guiding rib of the magazine.

Figure 3:
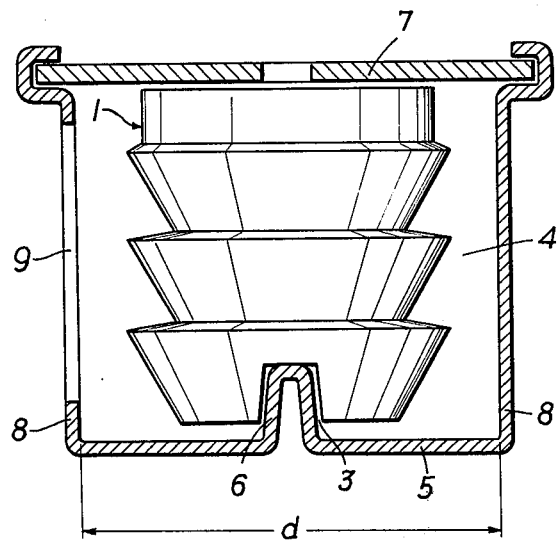
FIG. 3 is illustrating the arrangement of the stripe within the magazine channel, noting that the magazine channel is shown in a cross section.

FIG. 3 represents the stripe of dowels inserted into the magazine channel 4. The width $d$ of the magazine channel 4 is greater than the diameter of the dowel 1 and a guiding rib 6 is provided on the bottom 5 of the magazine and is engaging the guiding groove 3 for effecting the desired guiding action. The cover 7 of the magazine is placed in position after inserting a stripe into the magazine channel 4. The side walls 8 of the magazine do no more act as guiding surfaces so that one side wall or both side walls 8 may be provided with a window 9 allowing to watch the stripe of dowels 1 just located within the magazine channel.

Figure 4:
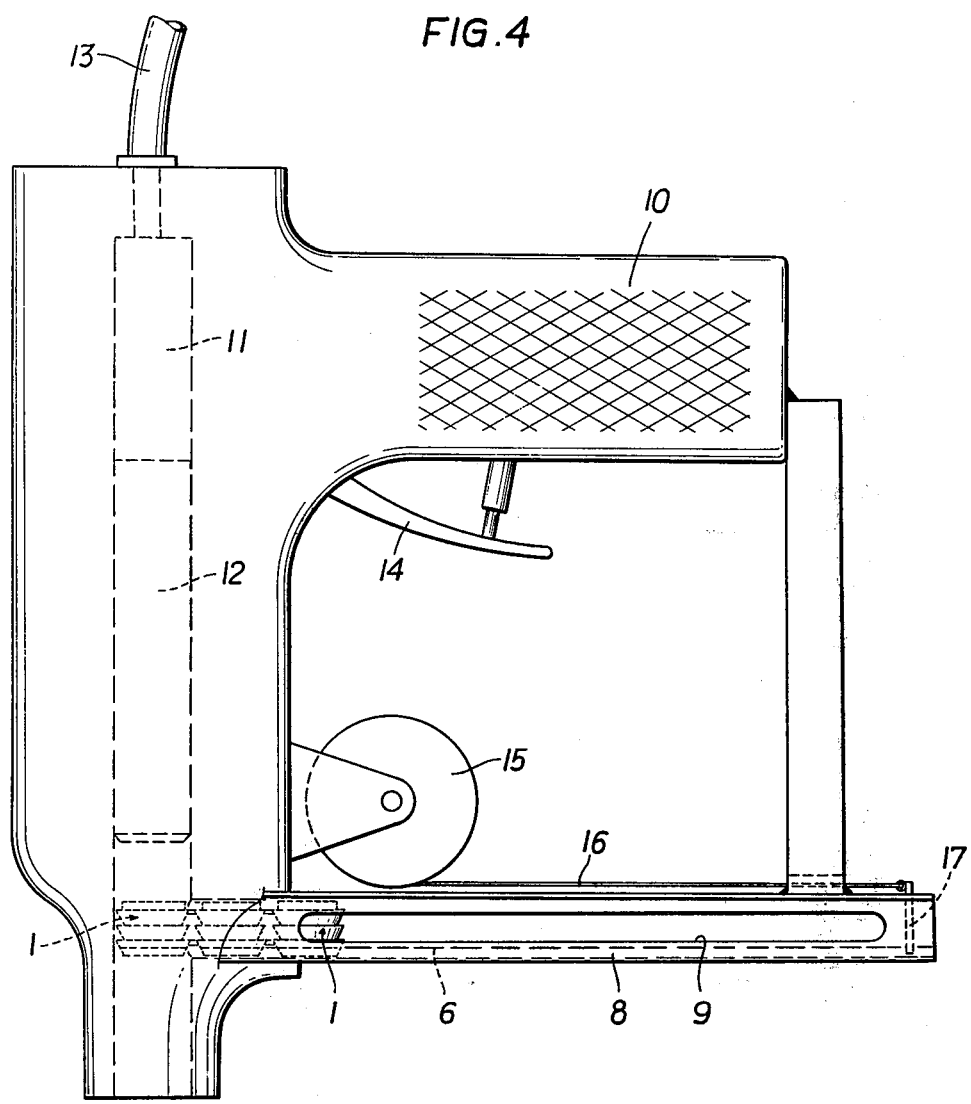
FIG. 4 represents a side elevation of the blowing apparatus for the dowels.

FIG. 4 represents a side elevation of the shooting or blowing apparatus for dowels. 10 is the handle, 11 is the channel guiding the rammer 12. 13 is a compressed-air conduit for supplying compressed-air to the rammer 12 and for forcing the rammer in downward direction. 14 is an operation lever for opening a valve not shown and for providing a connection between the compressed-air conduit 13 with the channel 11 located just above the rammer 12. The channel 11 is fed with dowels 1 via the magazine 8, noting that the rammer 12 is severing only one dowel 1 from the stripe of dowels and pushing this dowel in forward direction. 15 is a spool put under the action of a spring force such that a tape 16 is acting on a slide 17 pushing the dowels within the magazine 8 in lefthand direction and thus in direction to the channel 11.

What I claim is:

1. A plurality of dowels of synthetic material for use with a dowel driving apparatus of the type having a longitudinally extending magazine including dowel guiding means extending along the length of the magazine, each of said dowels having a head at one end thereof and a front face at the other end thereof and a body extending between said head and face, each said body having a substantially circular cross-section, each front face of each dowel having at least one recess extending across said body along a selected axis, said bodies of said dowels being connected by severable strap means to form an elongated strip with each said strap means extending parallel to said selected axis so that each said recess of each dowel will be alignable along said selected axis.

2. Dowels as claimed in claim 1, characterized in that the recess is formed by a groove being arranged in the middle of said front face and preferably being provided with plane side walls.

3. Dowels as claimed in claim 2 characterized in that the width of the groove is one-third to one-sixth, preferably approximately one-fifth, of the diameter of the dowel.

4. Dowels as claimed in claim 2 characterized in that the depth of the groove is approximately equal to the width thereof.

5. Dowels as claimed in claim 2 characterized in that the cross section of the groove has a taper of reducing width, seen in direction to the bottom of the groove.

* * * * *